United States Patent Office 3,352,515
Patented Nov. 14, 1967

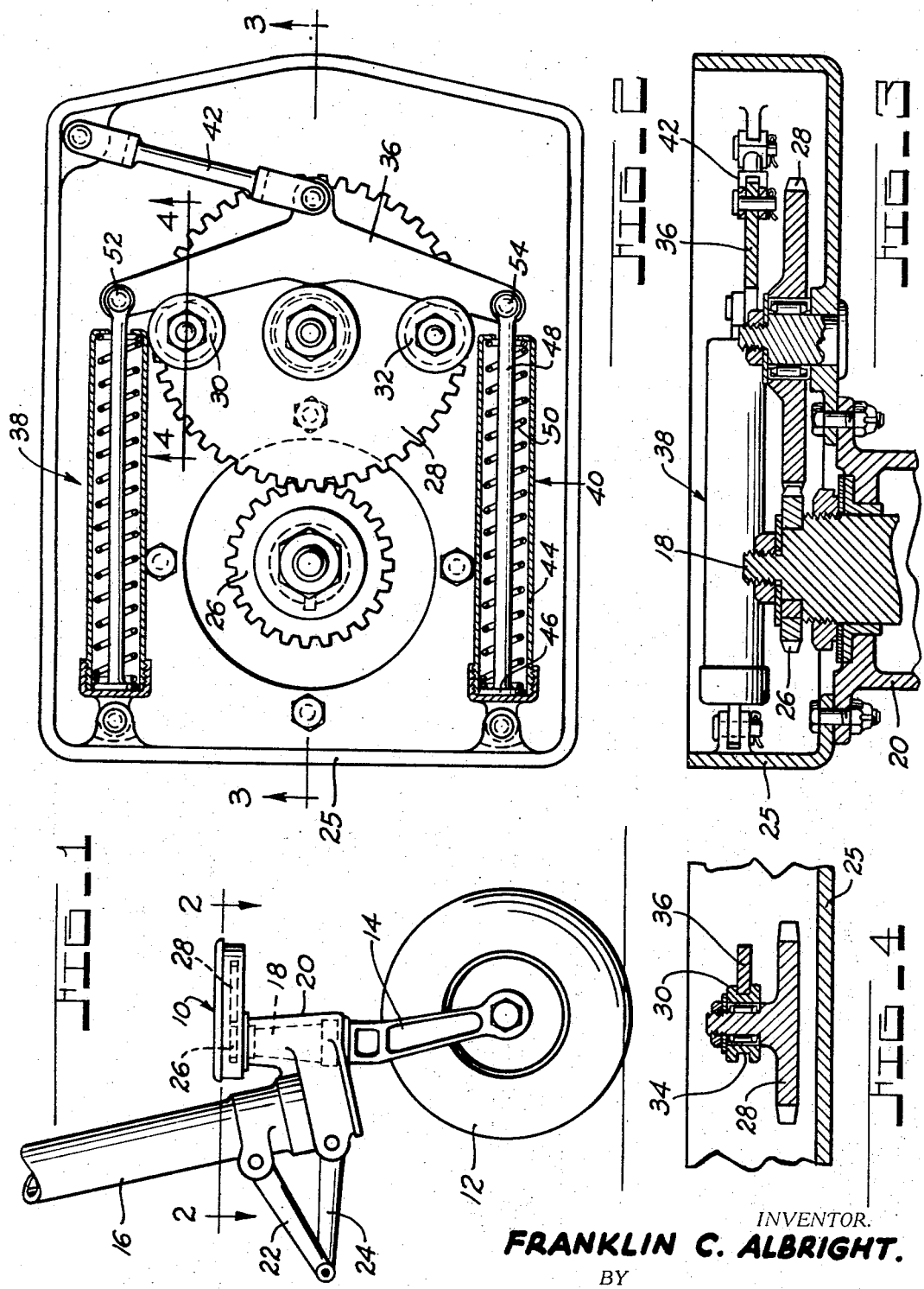

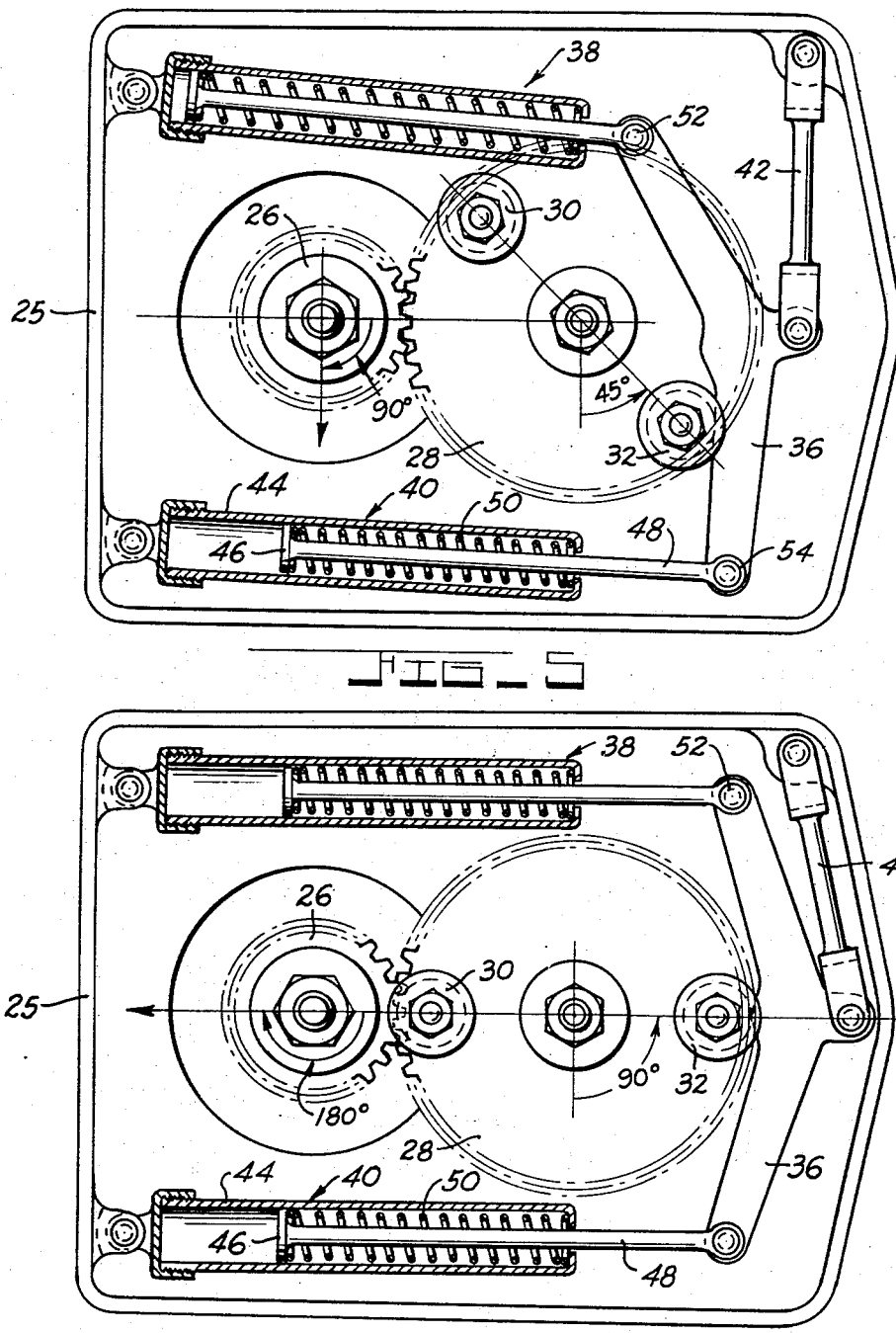

3,352,515
CASTERED WHEEL CENTERING MECHANISM
Franklin C. Albright, South Bend, Ind., assignor to The Bendix Corporation, a corporation of Delaware
Filed Mar. 7, 1966, Ser. No. 532,282
9 Claims. (Cl. 244—103)

This invention relates to a centering mechanism and, more particularly, to a centering mechanism for use in connection with an aircraft wheel having castering or equivalent motion.

In some aircraft it is necessary to rotate a landing wheel 360° when landing or taxiing. In such aircraft it is necessary that the wheel be relocated in some predetermined position prior to stowage or retraction of the landing gear.

Accordingly, it is an object of this invention to provide a centering mechanism for use in connection with such a wheel.

Another object of this invention is to provide an improved centering mechanism for such a wheel which is relatively simple in construction, inexpensive to manufacture, and easily installed and serviced.

A further object of this invention is to provide a centering mechanism for 360° of wheel rotation which exerts a substantially uniform centering torque.

More specifically, it is an object of this invention to provide a centering mechanism which includes a primary gear operatively connected to the aircraft wheel for concomitant angular movement therewith, a secondary gear meshing with said primary gear and having a pitch diameter twice as large as the pitch diameter of said primary gear, said secondary gear having two angular positions relative to said primary gear at which said wheel will be in the desired predetermined position, and spring loaded cam means operatively connected to said secondary gear for opposing angular movement thereof and urging same to one of said two angular positions.

The above and other objects and features of the invention will become apparent from the following description of the mechanism taken in connection with the accompanying drawings which form a part of this disclosure and in which:

FIGURE 1 is a side elevational view of a conventional castered wheel assembly which includes the centering mechanism suitably connected thereto;

FIGURE 2 is a view partially in section taken along line 2—2 of FIGURE 1;

FIGURE 3 is a sectional view taken along line 3—3 of FIGURE 2;

FIGURE 4 is a sectional view taken along line 4—4 of FIGURE 2; and

FIGURES 5 and 6 are sectional views similar to FIGURE 2 showing various positions of the centering mechanism components during rotation of the aircraft wheel.

Referring to FIGURE 1, it will be seen that the numeral 10 designates the centering mechanism which is installed on a conventional castered wheel assembly. More specifically, the assembly includes a wheel 12 suitably mounted for rotation on a wheel fork 14 carried at the lower end of a supporting strut 16. The strut is of a type known in the art, and contains spring means or hydraulic fluid as resistance means for damping movement of the fork and wheel to absorb the shock of vertical movement of the wheel. A spindle 18, which is a part of the wheel fork 14, is suitably supported in a housing 20. Links 22 and 24 are hinged together at one end and have the other ends thereof connected, respectively, to strut 16 and housing 20.

The centering mechanism 10 includes a housing 25 which is suitably mounted on top of the spindle housing 20, a primary gear 26, which is attached to the top of the spindle 18 through any suitable means, such as a key or spline, and a secondary gear 28, which is suitably mounted on the housing 25 and meshes with the primary gear. The gears are designed so that the pitch diameter of the secondary gear 28 will be exactly twice as large as the pitch diameter of the primary gear 26. Thus, a complete 360° angular rotation of the wheel 12 and primary gear 26 will cause the secondary gear to rotate only 180°.

Two cam rollers 30 and 32, which are suitably connected to the face of the secondary gear 28 at diametrically opposite locations, each contain an annular groove 34 for receiving the cam bar 36. The cam bar is supported in a floating condition by two spring cartridges, indicated generally by the numerals 38 and 40, and by a stabilizer bar 42. Each of the spring cartridges includes a cylinder 44, a piston 46, a piston rod 48, and a coil spring 50, which is confined between the piston 46 and the rod end of the cylinder. One of the piston rods 48 is pivotally connected to one end of the cam bar 36, whereas the other of the piston rods is pivotally connected to the other end of the cam bar. The stabilizer bar 42 has one end thereof pivotally connected to the middle of the cam bar and the other end thereof pivotally connected to the housing 25. The coil springs 50 of each of the cartridges 38 and 40 are of a predetermined length and load so that each will be in their most extended position when the aircraft wheel 12 is in the zero degree position and the rollers are in contact with the cam bar, as shown in FIGURE 2. Thus, rotation of the aircraft wheel in either direction will cause one of the springs to become more compressed than the other thereby producing the desired centering torque.

More specifically, operation of the centering mechanism will be as follows: As will be seen from FIGURES 2, 5 and 6, rotation of the aircraft wheel and primary gear 26 in a clockwise direction will cause rotation or angular movement of the secondary gear 28 in a counterclockwise direction. Thus, as shown in FIGURE 5, if the aircraft wheel and primary gear 26 have rotated 90°, the secondary gear will have rotated 45°. Such counterclockwise rotation of the secondary gear will cause roller 30 to move away from cam bar 36 and cause roller 32 to move towards cam bar 36. Such movement of roller 32, as shown in FIGURE 5, tends to cause counterclockwise rotation of the cam bar about pivot point 52 and increased compression of coil spring 50 of cartridge 40. At some predetermined angular movement of roller 32, in this instance approximately 45°, spring 50 of cartridge 40 will be compressed no further and continued movement of roller 32 in a counterclockwise direction will cause clockwise rotation of the cam bar about pivot point 54. Such movement of the cam bar will result in increased compression of coil spring 50 of cartridge 38 until, at 180° rotation of the aircraft wheel, or 90° rotation of the secondary gear 28, the centering mechanism components will be in the position shown in FIGURE 6 wherein the coil springs 50 of each of the cartridges 38 and 40 are compressed an equal amount and exert substantially an equal force against the oppositely disposed ends of the cam bar. Continued movement of roller 32 in a counterclockwise direction will cause clockwise rotation of the cam bar about pivot point 52 and reduced compression of coil spring 50 of cartridge 40 until approximately 135° of movement of roller 32, at which time cam bar 36 will rotate in a counterclockwise direction about pivot point 54 until the coil springs 50 of both cartridges 38 and 40 are fully extended, as shown in FIGURE 2. Thus, it can be seen that a force tending to center or relocate the aircraft wheel to the desired position is exerted by one or both of the springs 50 of cartridges 38 and 40 at all times. It should also be understood that the cam bar profile in contact with the roller is designed so that as the cam roller approaches the 90° position, shown in FIGURE 6, the direction of load on the roller will maintain the centering torque at a substantially uniform value. Furthermore, because of the cam surface contour at the center of the cam profile and the dynamic characteristics of the mechanism, it is not possible for the mechanism to stop at the 90° or dead center position. If desired, the centering mechanism may be designed so that the springs 50 of cartridges 38 and 40 bottom at some predetermined angular position (e.g. 45°) of the rollers 30 and 32.

Thus, by utilizing a centering mechaninsm of the type disclosed, which includes suitable load exerting springs and a predetermined cam profile, it is possible to produce a centering mechanism for 360° of wheel rotation with a substantially uniform centering torque.

The several practical advantages which flow from this type of an arrangement are believed to be obvious from the foregoing description, and other advantages may suggest themselves to those who are familiar with the art to which this invention relates.

Furthermore, although this invention has been described in connection with a specific embodiment it will be obvious to those skilled in the art that various changes may be made in the form, structure and arrangement of parts without departing from the spirit of the invention. Accordingly, I do not desire to be limited to the specific embodiment disclosed herein primarily for purposes of illustration, but instead desire protection falling within the scope of the appended claims.

Having thus described the various features of the invention what I claim as new and desire to secure by Letters Patent is:

1. In an aircraft landing wheel assembly having a supporting member, a wheel, and a wheel-carrying member operatively connected to said supporting member for relative angular movement with respect thereto, a centering mechanism for returning said wheel-carrying member and wheel to a predetermined position comprising a housing operatively connected to said supporting member, a primary gear located in said housing and operatively connected to said wheel-carrying member for concomitant angular movement therewith, a secondary gear meshing with said primary gear and having a pitch diameter twice as large as the pitch diameter of said primary gear, said secondary gear having two angular positions relative to said primary gear at which said wheel will be in said predetermined position, and means operatively connected to said secondary gear for opposing angular movement thereof and urging same to one of said two angular positions.

2. The combination defined in claim 1, wherein said last named means includes resilient means operatively connected to said housing and said secondary gear for opposing angular movement thereof and urging same to one of said two angular positions.

3. The combination defined in claim 2, wherein said resilient means includes first and second spring means operatively connected to said housing and said secondary gear for opposing angular movement thereof in both directions and urging same to one of said two angular positions.

4. The combination defined in claim 3, wherein the operative connection between said secondray bear and said first and second spring means includes a cam bar having one end thereof operatively connected to said first spring means and the other end thereof operatively connected to said second spring means, and first and second diametrically opposed cam rollers connected to the face of said secondary gear, at least one of which is continuously in abutment with said cam bar.

5. The combination defined in claim 4, wherein a stabilizer bar has one end thereof pivotally connected to said housing and the other end thereof pivotally connected to said cam bar at a point intermediate the ends thereof.

6. The combination defined in claim 5, wherein said first cam roller abuts said cam bar during 180° of rotation of said secondary gear and said second cam roller abuts said cam bar during the remaining 180° of rotation of said secondary gear.

7. The combination defined in claim 6, wherein said first and second spring means each include a cylinder, a piston, a piston rod and a coil spring confined between said piston and the end of said cylinder, said piston rod of said first spring means being pivotally connected to said one end of said cam bar and said piston rod of said second spring means being pivotally connected to said other end of said cam bar.

8. The combination defined in claim 7, wherein each of said cam rollers include an annular groove for receiving said cam bar.

9. The combination defined in claim 8, wherein the cam bar profile in abutment with said rollers is formed so that the direction of load on said abutting roller is such that the centering torque will be maintained at a substantially uniform value.

References Cited

UNITED STATES PATENTS

| | | | |
|---|---|---|---|
| 2,294,850 | 9/1942 | Ostrander | 244—109 |
| 2,312,553 | 3/1943 | Hudson | 244—109 |
| 2,508,351 | 5/1950 | Bjerke | 244—103 |

MILTON BUCHLER, *Primary Examiner.*

P. E. SAUBERER, *Assistant Examiner.*